(12) United States Patent
Xiong et al.

(10) Patent No.: US 8,896,594 B2
(45) Date of Patent: Nov. 25, 2014

(54) DEPTH SENSING WITH DEPTH-ADAPTIVE ILLUMINATION

(75) Inventors: Zhiwei Xiong, Beijing (CN); Feng Wu, Beijing (CN); Yueyi Zhang, Beijing (CN); Pengyu Cong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 13/539,362

(22) Filed: Jun. 30, 2012

(65) Prior Publication Data

US 2014/0002445 A1     Jan. 2, 2014

(51) Int. Cl.
*G06T 15/00*       (2011.01)

(52) U.S. Cl.
USPC ............................ 345/419; 345/422; 356/603

(58) Field of Classification Search
USPC .................................. 345/419, 422; 356/603
See application file for complete search history.

(56) References Cited

U.S. PATENT DOCUMENTS

| | | | |
|---|---|---|---|
| 6,229,913 | B1 | 5/2001 | Nayar et al. |
| 2004/0005092 | A1 | 1/2004 | Tomasi |
| 2007/0036427 | A1 | 2/2007 | Nakamura et al. |
| 2007/0189750 | A1 | 8/2007 | Wong et al. |
| 2007/0297784 | A1 | 12/2007 | Wong et al. |
| 2009/0244090 | A1 | 10/2009 | Zhang et al. |
| 2010/0304854 | A1 | 12/2010 | McEldowney |
| 2011/0109617 | A1 | 5/2011 | Snook et al. |
| 2011/0274366 | A1 | 11/2011 | Tardif |
| 2011/0285825 | A1 | 11/2011 | Tian et al. |
| 2012/0056982 | A1 | 3/2012 | Katz et al. |

FOREIGN PATENT DOCUMENTS

WO     2007/043036     4/2007

OTHER PUBLICATIONS

Inokuchi, et al., "Range-imaging System for 3-D Object Recognition," Proceedings of the International Conference on Pattern Recognition, 1984, vol. 2, IEEE Computer Society Press, pp. 806-808.
Bimber, et al., "Multifocal Projection: A Multiprojector Technique for Increasing Focal Depth," retrieved at <<http://ieeexplore.ieee.org/stamp/stamp.jsp?tp=&arnumber=1634329>>, IEEE Transactions on Visualization and Computer Graphics, vol. 12, No. 4, Jul. 2006, pp. 658-667.
Geng, Jason, "Structured-light 3D Surface Imaging: A Tutorial," retrieved at <<http://www.opticsinfobase.org/view_article.cfm?gotourl=http%3A%2F%2Fwww%2Eopticsinfobase%2Eorg%2FDirectPDFAccess%2F0B12F882%2DDEF8%2-D7947%2D9211B0858A36D172%5F211561%2Epdf%3Fda%3-D1%26id%3D211561%26seq%3D0%26mobile%3Dno&org=>>, Advances in Optics and Photonics, vol. 3, No. 2, Mar. 2011, pp. 128-160.
Salvi, et al., "Pattern Codification Strategies in Structured Light Systems," retrieved at <<http://automodelingandvideomapping.googlecode.com/svn/trunk/doc/papers/variosjf/2004-PR-codif-strategies-structuredlight.pdf>>, Pattern Recognition, vol. 37, No. 4, 2004, pp. 827-849.

(Continued)

*Primary Examiner* — Maurice L McDowell, Jr.
(74) *Attorney, Agent, or Firm* — Dan Choi; Judy Yee; Micky Minhas

(57) ABSTRACT

An adaptive depth sensing system (ADSS) illuminates a scene with a pattern that is constructed based on an analysis of at least one prior-generated depth map. In one implementation, the pattern is a composite pattern that includes two or more component patterns associated with different depth regions in the depth map. The composite pattern may also include different illumination intensities associated with the different depth regions. By using this composite pattern, the ADSS can illuminate different objects in a scene with different component patterns and different illumination intensities, where those objects are located at different depths in the scene. This process, in turn, can reduce the occurrence of defocus blur, underexposure, and overexposure in the image information.

20 Claims, 9 Drawing Sheets

(56) References Cited

OTHER PUBLICATIONS

Avidan, et al., "Trajectory Triangulation: 3D Reconstruction of Moving Points from a MonocularImage Sequence," retrieved at <<http://www.eng.tau.ac.il/~avidan/papers/Traj-Trian-Pami.pdf>>, IEEE Transactions on Pattern Analysis and Machine Intelligence, vol. 22, No. 4, 2000, pp. 348-357.

Koninckx, et al., "Scene-adapted Structured Light," retrieved at <<http://graphics.cs.kuleuven.be/publications/SASL2005/sasl.pdf>>, Proceedings of the IEEE Conference on Computer Vision and Pattern Recognition, 2005, 8 pages.

Dhond, et al., "Structure from Stereo—A Review," retrieved at <<http://ieeexplore.ieee.org/stamp/stamp.jsp?tp=&arnumber=44067>>, IEEE Transaction on Systems, Man, Cybernetics, vol. 19, No. 6, 1989, pp. 1489-1510.

Woodham, Robert J., "Photometric method for determining surface orientation from multiple images," retrieved at <<http://www.umiacs.umd.edu/~raghuram/ENEE731/Stereo/Woodham80c.pdf>>, Optical Engineering, vol. 19, No. 1, 1980, pp. 139-144.

Horn, Berthold, K. P., "Height and Gradient from Shading," retrieved at <<http://people.csail.mit.edu/bkph/papers/Height_And_Gradient.pdf>>, International Journal Computer Vision, vol. 5, No. 1, 1990, pp. 37-75.

Zhang, et al., "Projection Defocus Analysis for Scene Capture and Image Display," retrieved at <<http://www1.cs.columbia.edu/CAVE/publications/pdfs/Zhang_TOG06.pdf>>, Proceedings of ACM SIGGRAPH 2006, 2006, 9 pages.

Favaro, et al., "A Geometric Approach to Shape from Defocus," retrieved at <<http://ieeexplore.ieee.org/stamp/stamp.jsp?tp=&arnumber=1388266>>, IEEE Transactions on Pattern Analysis and Machine Intelligence, vol. 27, No. 3, 2005, pp. 406-417.

Levin, et al., "Image and Depth from a Conventional Camera with a Coded Aperture," retrieved at <<http://groups.csail.mit.edu/graphics/CodedAperture/CodedAperture-LevinEtAl-SIGGRAPH07.pdf>>, Proceedings of ACM SIGGRAPH 2007, 2007, 9 pages.

Lange, et al., "Solid-State Time-of-Flight Range Camera," retrieved at <<http://ieeexplore.ieee.org/stamp/stamp.jsp?tp=&arnumber=910448>>, IEEE Journal of Quantum Electronics, vol. 37, No. 3, 2001, pp. 390-397.

Albitar, et al., "Robust Structured Light Coding for 3D Reconstruction," retrieved at <<http://ieeexplore.ieee.org/stamp/stamp.jsp?tp=&arnumber=4408982>>, IEEE 11th International Conference on Computer Vision, ICCV 2007, 2007, 6 pages.

Chen, et al., "Vision Processing for Realtime 3-D Data Acquisition Based on Coded Structured Light," retrieved at <<http://ieeexplore.ieee.org/stamp/stamp.jsp?tp=&arnumber=4429304>>, IEEE Transactions on Image Processing, vol. 17, No. 2, 2008, pp. 167-176.

Nayar, et al., "Programmable Imaging using a Digital Micromirror Array," retrieved at <<http://ieeexplore.ieee.org/stamp/stamp.jsp?tp=&arnumber=1315065>>, Proceedings of the 2004 IEEE Computer Society Conference on Computer Vision and Pattern Recognition, CVPR 2004, 2004, 8 pages.

Dudley, et al., "Emerging Digital Micromirror Device (DMD) Applications," retrieved at <<http://www.wintechdigital.com.cn/Upfiles/20081114001.pdf>>, In Proceedings of SPIE, vol. 4985, 2003, 12 pages.

Narasimhan, et al., "Temporal Dithering of Illumination for Fast Active Vision," retrieved at <<http://www.dh.aist.go.jp/~shun/research/dIp/eccv08.pdf>>, Proceedings of the 10th European Conference on Computer Vision, Part IV, 2008, pp. 830-844.

Garcia, et al., "Selection of Temporally Dithered Codes for Increasing Virtual Depth of Field in Structured Light Systems," retrieved at <<http://ieeexplore.ieee.org/stamp/stamp.jsp?tp=&arnumber=5543496>>, IEEE International Workshop on Projector-Camera Systems, ProCams 2010, 2010, pp. 88-95.

Scharstein, et al., "A Taxonomy and Evaluation of Dense Two-FrameStereo Correspondence Algorithms," retrieved at <<http://vision.middlebury.edu/stereo/taxonomy-IJCV.pdf>>, International Journal of Computer Vision, vol. 47, No. 1, 2002, 35 pages.

"Xbox 360 + Kinect," retrieved at <<http://www.xbox.com/en-US/kinect>>, retrieved on Mar. 27, 2012, Microsoft Corporation, Redmond, WA, 2 pages.

"Mantis Vision," retrieved at <<http://www.mantis-vision.com/>>, retrieved on Mar. 20, 2012, Mantis Vision, Tel Aviv, Israel, 1 page.

Goodman, Joseph W., Speckle Phenomena in Optics, retrieved at <<http://www.amazon.com>>, retrieved on Jun. 21, 2012, Roberts and Company Publishers, 1st Edition Edition, Nov. 1, 2010, Amazon.com product page only, 5 pages.

"Speckle pattern," retrieved at <<http://en.wikipedia.org/wiki/Speckle_pattern>>, retrieved on Jun. 21, 2012, Wikipedia article, 3 pages.

Koninckx, et al., "Real-Time Range Acquisition by Adaptive Structured Light," IEEE Transactions on Pattern Analysis and Machine Intelligence, vol. 28, Issue 3, Mar. 2006, pp. 432-445.

Zhang, Song, "Recent progresses on real-time 3D shape measurement using digital fringe projection techniques," Optics and Lasers in Engineering, vol. 48, Issue 2, Feb. 2010, pp. 149-158.

DEPTH SENSING WITH DEPTH-ADAPTIVE ILLUMINATION

BACKGROUND

A conventional structured light depth sensing system operates by projecting a fixed 2D pattern onto a scene. The depth sensing system then captures image information which represents the scene, as illuminated by the pattern. The depth sensing system then measures the shift that occurs between the original pattern that is projected onto the scene and pattern content that appears in the captured image information. The depth sensing system can then use this shift, together with the triangulation principle, to determine the depth of surfaces in the scene.

A depth sensing system may produce image information having poor quality in certain circumstances. However, known depth sensing systems do not address these quality-related issues in a satisfactory manner.

SUMMARY

An adaptive depth sensing system (ADSS) is described herein which produces image information with improved quality (with respect to non-adaptive depth sensing systems). For example, the ADSS can reduce the occurrence of defocus blur, overexposure, and underexposure in the image information captured by the ADSS. The ADSS achieves this result by illuminating a scene with a pattern that is constructed based on an analysis of at least the last-generated depth map.

In one implementation, the ADSS operates by identifying different depth regions in the depth map(s). The ADSS then generates a composite pattern having different component patterns and illumination intensities assigned to the respective depth regions. Each component pattern includes features that have a particular property, and different component patterns include features having different respective properties. For example, in one non-limiting case, each component pattern includes features having a particular size and/or illumination intensity, and different component patterns include features having different respective sizes and/or illumination intensities.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of an illustrative adaptive depth sensing system (ADSS). Section B describes illustrative functionality for deriving a set of component patterns for use by the ADSS. Section C describes an illustrative approach for generating a mapping table for use by the ADSS. Section D describes an illustrative approach for setting up and initializing the ADSS. Section E describes illustrative computing functionality that can be used to implement any aspect of the features described in preceding sections.

Figure 12:
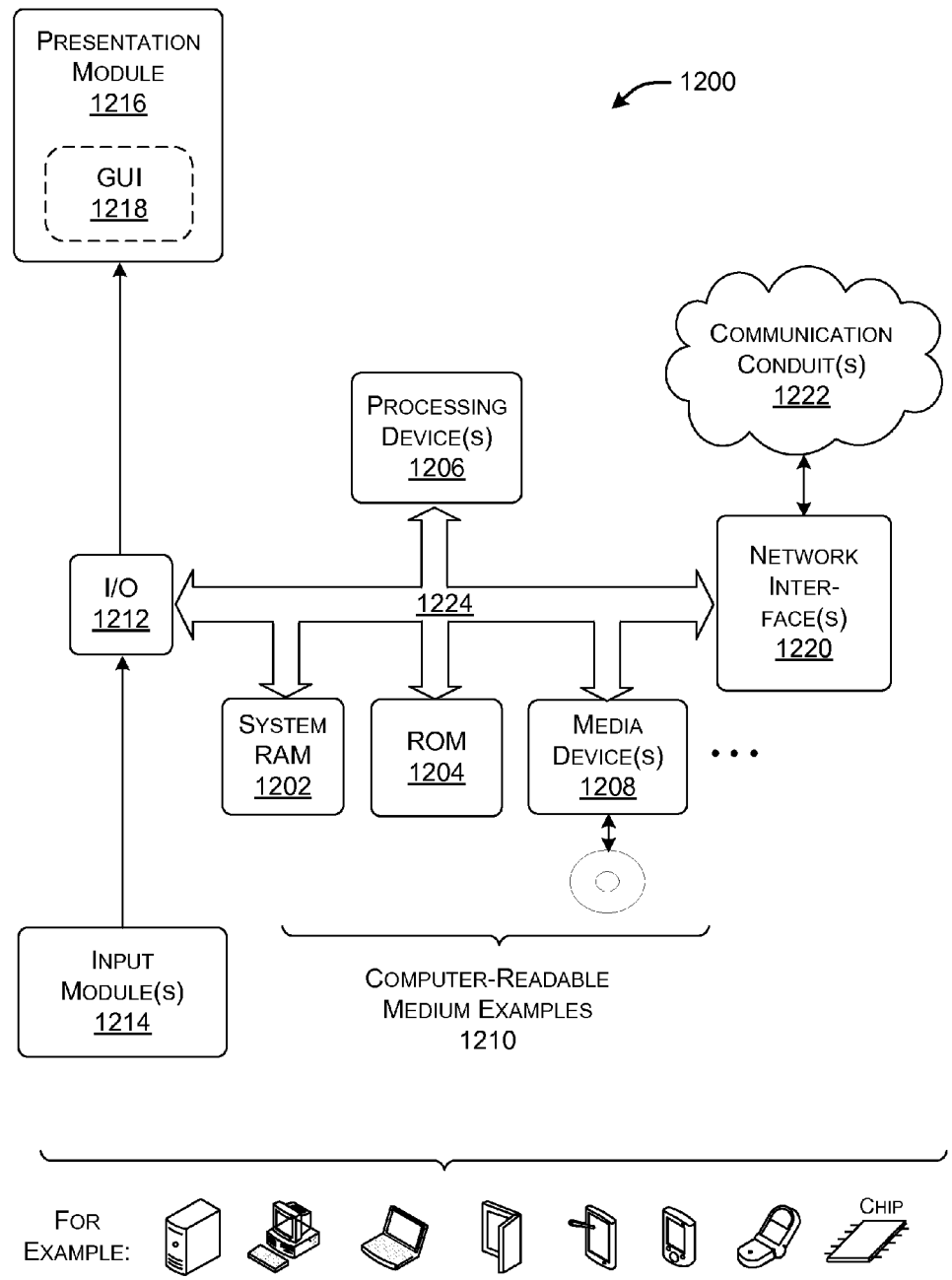
FIG. 12 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Overview

Figure 1:
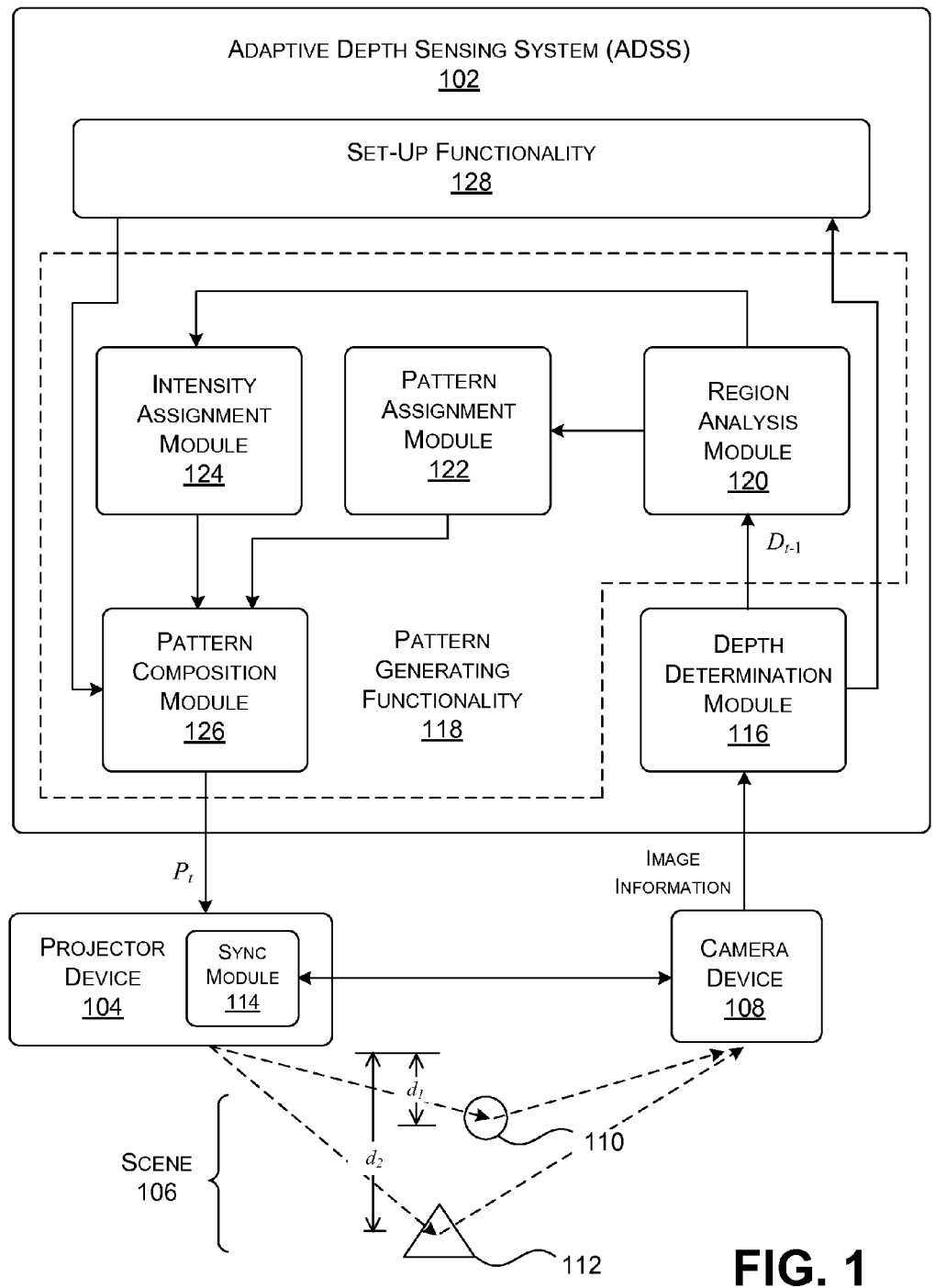
FIG. 1 shows an illustrative environment that includes an adaptive depth sensing system (ADSS).

FIG. 1 shows an illustrative environment that includes an adaptive depth sensing system (ADSS) 102. The ADSS 102 uses a projector device 104 to project a pattern onto a scene 106. The ADSS 102 uses a camera device 108 to capture image information from the scene 106. That is, the image information represents the scene 106 as illuminated by the pattern. The ADSS 102 then analyzes the image information, in conjunction with the original pattern, to construct a depth map. The depth map represents the depths of surfaces within the scene 106.

For example, in the representative case of FIG. 1, the depth map represents the depths of the surfaces of a sphere 110 and pyramid 112 within the scene 106. The depths are measured with respect to a reference point, such as the source of the projected pattern (e.g., the projector device 104). In this representative example, the sphere 110 is located at an average distance $d_1$ with respect to the reference point, while the pyramid 112 is located at an average distance $d_2$ with respect to the reference point, where $d_1 < d_2$.

The ADSS 102 is adaptive in the sense that the manner in which it illuminates the scene 106 is dependent on its analysis of at least the last-computed depth map. More formally stated, the ADSS 102 performs analysis on at least depth map $D_{t-1}$ that has been produced at time t−1, to derive an analysis result. The ADSS 102 then generates a pattern $P_t$ based on this analysis result. In doing so, the ADSS 102 can provide appropriate illumination to different surfaces in the scene 106 which occur at different respective depths. For example, the ADSS 102 can illuminate the sphere 110 with one part of the pattern $P_t$ and illuminate the pyramid 112 with another part of the pattern $P_t$. This manner of operation, in turn, can improve the quality of the image information captured by the camera device 108. For example, the ADSS 102 can reduce the occurrence of defocus blur, underexposure, and/or overexposure in the image information.

With the above introduction, the components of FIG. 1 will be now described in detail. The ADSS 102 as a whole can be implemented by one or more computing devices of any type, such as a personal computer, a tablet computing device, a mobile telephone device, a personal digital assistant (PDA) device, a set-top box, a game console device, and so on. More generally, the functionality of the ADSS 102 can be contained at a single site or distributed over plural sites. For example, although not shown, one or more components of the ADSS 102 can rely on processing functionality that is provided at a remote location with respect to the projector device 104 and the camera device 108. The ADSS 102 can also include one or more graphical processing units that perform parallel processing of image information to speed up the operation of the ADSS 102. Section E provides further details regarding representative implementations of the ADSS 102.

The ADSS 102 is coupled to the projector device 104 and the camera device 108 through any type of communication conduits (e.g., hardwired links, wireless links, etc.). Alternatively, the projector device 104 and/or the camera device 108 may correspond to components in the same housing as the ADSS 102. The projector device 104 can be implemented as a programmable projector that projects a pattern onto a scene. In one merely representative case, for example, the projector device 104 can be implemented by the DLP® LightCommander™ produced by Texas Instruments, Incorporated, of Dallas, Tex., or any like technology. The camera device 108 can be implemented by any type of image capture technology, such as a CCD device. The projector device 104 and camera device 108 can emit and receive, respectively, any type of electromagnetic radiation, such as visible light, infrared radiation, etc.

While not illustrated in FIG. 1, in one representative setup, a lens of the projector device 104 can be vertically aligned with a lens of the camera device 108. (This is illustrated, for example, in FIG. 8, to be described in turn). The vertical arrangement of the projector device 104 with respect to the camera device 108 ensures that pattern shift only occurs vertically. However, other implementations can adopt other orientations of the projector device 104 with respect to the camera device 108. Moreover, other implementations can include two or more projector devices (not shown) and/or two or more camera devices (not shown). For example, the use of two or more camera devices allows the ADSS 102 to provide a more comprehensive representation of objects within the scene 106.

The projector device 104 may also include a synchronization module 114. The synchronization module 114 synchronizes the operation of the projector device 104 with the camera device 108. For example, the synchronization module 114 can prompt the camera device 108 to capture image information in response to the projection of a pattern by the projector device 104, e.g., by sending a triggering signal from the projector device 104 to the camera device 108. In other implementations, the synchronization module 114 may represent standalone functionality (that is, functionality that is separate from the projector device 104), or functionality that is incorporated into some other module shown in FIG. 1.

The ADSS 102 itself can include (or can be conceptualized as including) multiple components that perform different tasks. A depth determination module 116 utilizes the principle of triangulation to generate a depth map of the scene 106, based on the original pattern $P_t$ that is projected onto the scene 106, and the pattern that appears in the image information captured by the camera device 108. More formally stated, the depth determination module 116 first determines a pattern shift $\Delta_t$ that occurs between image information $I_t$ captured by the camera device 108 at time t, and a reference image $I_t'$. (Additional explanation will be provided below regarding the manner in which the reference image $I_t'$ is computed.) For example, the depth determination module 116 can produce the pattern shift $\Delta_t$ by matching each pixel in an extended block in the captured image information $I_t$ with its most similar counterpart in the reference image $I_t'$. The depth determination module 116 can execute this matching in any manner, such as by using a normalized cross-correlation technique.

The depth determination module 116 can then determine the depth map, $D_t$, based on the equation:

$$D_t = \frac{FHD_0}{FH + D_0 \Delta_t}, t = 1, 2, \ldots \, .$$

In this expression, F is the focal length of the camera device 108, H is the distance between projector device's lens and the camera device's lens, $D_0$ refers to a depth that is used in connection with generating the reference image $I_t'$ (to be described below), and $\Delta_t$ is the pattern shift. In one representative implementation, the depth determination module 116 generates the depth map $D_t$ for each pixel of the captured image information $I_t$, because that is the granularity in which the pattern shift $\Delta_t$ is generated.

At this stage, pattern generation functionality 118 analyzes the depth map to generate a new pattern. More specifically, the pattern generation functionality 118 generates a new pattern $P_t$ for a new time instance t based on a depth map $D_{t-1}$ that has been captured in a prior time instance, e.g., t−1. In other implementations, however, the pattern generation functionality 118 can generate a new pattern $P_t$ based on the n prior depth maps that have been generated, where n≥2. The pattern generation functionality 118 can resort to this approach in cases in which there is quick movement in the scene 106. Additional explanation will be provided at a later juncture of this description regarding the use of plural depth maps to calculate $P_t$. In the immediately following explanation, however, it will be assumed that the pattern generation functionality 118 generates $P_t$ based on only the last-generated depth map, namely $D_{t-1}$.

The pattern generation functionality 118 includes a region analysis module 120, a pattern assignment module 122, an intensity assignment module 124, and a pattern composite module 126. To begin with, the region analysis module 120 examines the depth map $D_{t-1}$ to identify depth regions in the depth map $D_{t-1}$ that have surfaces of similar depths (with respect to the reference point, such as the projector device 104). In one implementation, for example, the region analysis module 120 can use a region growing algorithm to identify M continuous and non-overlapping regions, each having a similar depth value. The region analysis module 120 can represent the depths of each depth region as the average of the depths (of surfaces) within the region. That is, the depth region $R(d_1)$ includes surfaces with an average depth $d_1$ with respect to the reference point, the depth region $R(d_2)$ includes surfaces with an average depth $d_2$ with respect to the reference point, and so on. In FIG. 1, assume that the surfaces of the sphere 110 are encompassed by a first depth region, while the surfaces of the pyramid 112 are encompassed by a second depth region.

The region analysis module 120 then defines a set of masks $B_t$ associated with the different depth regions, where $B_t = \{B_{t,m}\}_{m=1}^{M}$, and where $B_{t,m}$ refers to an individual mask within a set of M masks. To perform this task, the region analysis module 120 maps the depth regions that have been identified in the coordinate system of the camera device 108 to the coordinate system of the projector device 104. This mapping can be derived from the calibration of the projector device 104 and the camera device 108, described in Section D. The masks demarcate different parts of the pattern $P_t$ that is to be generated. For example, a first mask may demarcate a first part of the pattern $P_t$ that will be tailored to illuminate the sphere 110, while a second mask may demarcate a second part of the pattern $P_t$ that will be tailored to illuminate the pyramid 112.

A pattern assignment module 122 assigns a different component pattern to each depth region and its corresponding part of the pattern $P_t$. (Insofar as the pattern $P_t$ includes multiple components, it is henceforth referred to as a composite pattern to distinguish it from its constituent component patterns.) Further, each component pattern includes features having a particular property, where different component patterns include features having different respective properties. For example, in the detailed examples presented herein, each component pattern has speckle features of a particular size. In other implementations, each component pattern has code-bearing features having a particular design (e.g., permutation), such as binary-coded features having a particular design.

The pattern assignment module 122 assigns a component pattern to each depth region by consulting a mapping table. The mapping table maps different ranges of depths to different respective component patterns. That is, consider a depth region with an average depth of 1.5 m. The pattern assignment module 122 can consult the mapping table to determine the component pattern that is associated with this depth, where that component pattern has a particular feature property. The pattern assignment module 122 will then assign the identified component pattern to the part of the composite pattern $P_t$ that is devoted to the depth region in question.

An intensity assignment module 124 assigns an illumination intensity to each depth region and its corresponding part of the composite pattern $P_t$. Generally, exposure E is related to illumination intensity q and depth d according to the equation:

$$E = \frac{q}{d^2}.$$

Further, consider the case of a candidate pattern with a dynamic range [0, $q_0$], that is, with grayscale values ranging from 0 to $q_0$. Further assume that image information captured from the scene at reference depth $d_0$ is not underexposed (with respect to grayscale value 0) and not overexposed (with respect to grayscale value $q_0$), but would be underexposed and overexposed below and above this range, respectively. Proper exposure can be obtained for the same pattern with a scaled dynamic range [0, q] captured at depth d provided that:

$$q = \frac{d^2}{d_0^2} q_0.$$

The intensity assignment module 124 can leverage the above-described principle by changing the dynamic intensity range of each projected component pattern to achieve a desired illumination intensity, based on the average depth of a particular depth region. More specifically, the intensity assignment module 124 can assign an illumination intensity β to each depth region j (and each corresponding part of the composite pattern $P_t$) according to the following equation:

$$\beta = \lambda \frac{d_j^2}{d_0^2} + b,$$

where $d_j$ corresponds to the average depth of the depth region j in question, $d_0$ corresponds to the reference depth, and λ and b are empirically-determined constants. In one merely representative environment, λ is set to approximately 0.9 and b is set of approximately 0.1.

The pattern composition module 126 constructs the new composite pattern $P_t$ based on the masks that have been generated by the region analysis module 120, the component patterns that have been selected by the pattern assignment module 122, and the illumination intensities that have been calculated by the intensity assignment module 124. More formally stated, in one implementation, the pattern composition module 126 constructs the composite pattern $P_t$ based on the following equation:

$$P_t = \sum_{m=1}^{M} P_{S,m} B_{t,m} \beta_{t,m}, \quad t > 1,$$

where M refers to the number of parts in the composite pattern $P_t$, $P_{S,m}$ refers to the component pattern to be applied to the part m of the composite pattern $P_t$ (which, in turn, corresponds to a particular depth region in the depth map $D_{t-1}$), $B_{t,m}$ refers to the mask that demarcates the part m, and $\beta_{t,m}$ refers to the illumination intensity to be applied to the part m.

The projector device 104 projects this composite pattern $P_t$ onto the scene 106, triggering the depth determination module 116 to capture another depth map, and the pattern generation functionality 118 to generate another composite pattern $P_{t+1}$. In one implementation, this cycle of computation repeats for every captured frame of image information. However, in other implementations, the pattern generation functionality 118 can regenerate the composite pattern on a less frequent basis. For example, the pattern generation functionality 118 may only generate a new composite pattern if it detects significant movement of the objects within the scene 106.

Finally, set-up functionality 128 performs various roles in connection with setting up and initializing the ADSS 102. These tasks include: calibrating the projector device 104 and the camera device 108, capturing a reference image set $I_S$, and capturing the first depth map. Section D provides additional details regarding these preliminary tasks.

Figure 2:
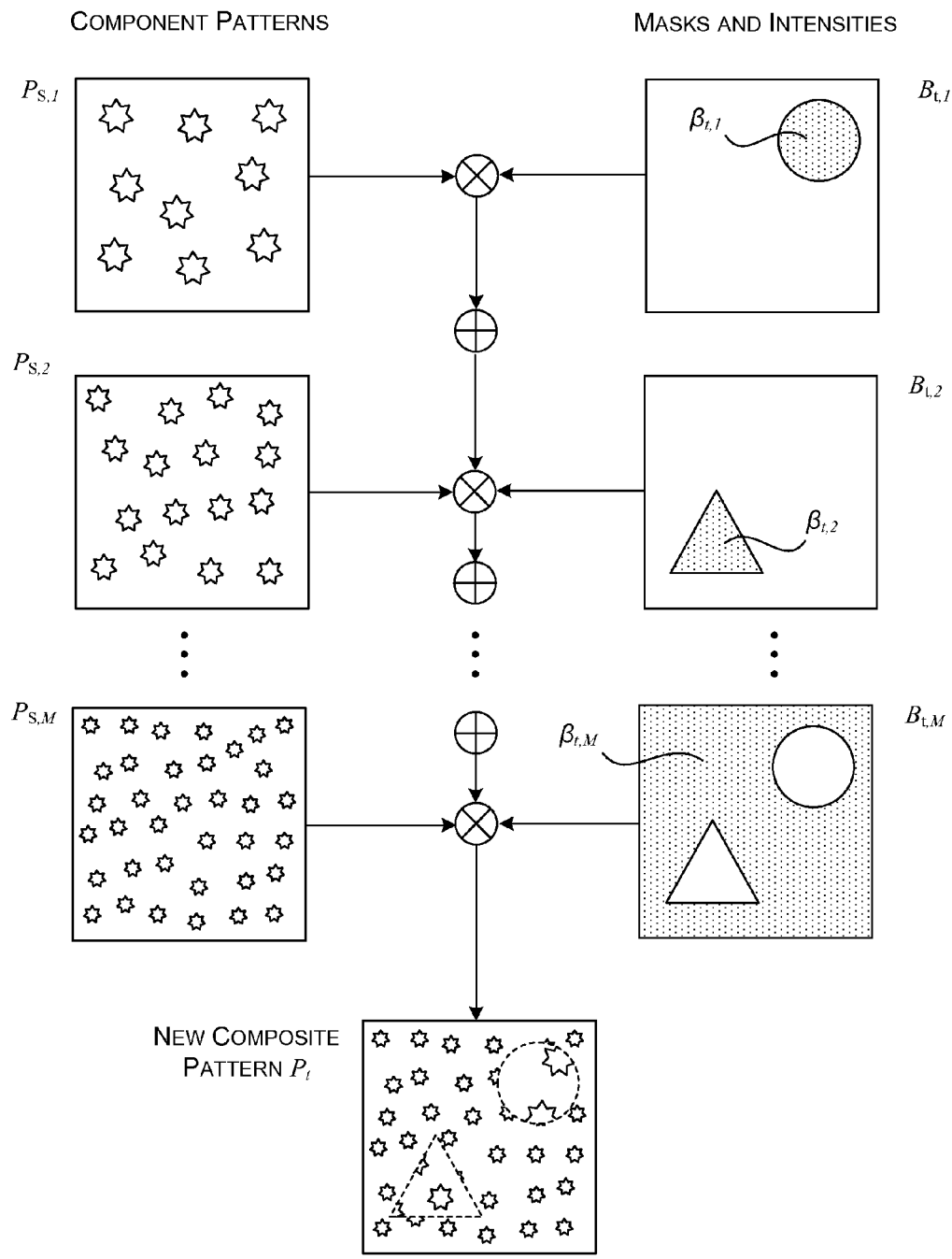
FIG. 2 graphically illustrates one manner by which the ADSS of FIG. 1 can generate a composite pattern.

Advancing to FIG. 2, this figure provides a high-level conceptual depiction of the operation of the pattern generation functionality 118 of the ADSS 102. Assume that the region analysis module 120 has identified at least three depth regions associated with the scene 106 and at least three corresponding masks. More specifically, the region analysis module 120 assigns a first mask $B_{t,1}$ to a depth region associated with the sphere 110 and a second mask $B_{t,2}$ to a depth region associated with the pyramid 112. The region analysis module 120 may also assign a background mask $B_{t,M}$ to all other regions besides the depth region associated with the sphere 110 and pyramid 112.

The pattern assignment module 122 assigns a first component pattern $P_{S,1}$ to the part of the composite pattern demarcated by the first mask $B_{t,1}$, a second component pattern $P_{S,2}$ to the part of the composite pattern demarcated by the second mask $B_{t,2}$, and a third component pattern $P_{S,M}$ to the part of the composite pattern demarcated by the third mask $B_{t,M}$. In this non-limiting example, these three component patterns are speckle patterns. Further, note that the speckle features of these three component patterns have different respective sizes; for instance, the speckle features in the first component pattern $P_{S,1}$ have the largest size and the speckle features in the third component pattern $P_{S,M}$ have the smallest size. As mentioned above, in another example, each component pattern may alternatively have a particular code-bearing design, differing from the code-bearing designs of other component patterns.

Note that the star shapes in FIG. 2 represent the speckle features in a high-level conceptual form. In an actual implementation, the speckle features may have random (or pseudo-random) shapes and random (or pseudo-random) arrangements of those shapes. Further, the actual sizes of the speckle features may be different from those depicted in FIG. 2. Section B provides additional details regarding how speckle component patterns having different sized features may be generated.

The intensity assignment module 124 assigns a first illumination intensity $\beta_{t,1}$ to the part of the composite pattern demarcated by the first mask $B_{t,1}$, a second illumination intensity $\beta_{t,2}$ to the part of the composite pattern demarcated by the second mask $B_{t,2}$, and a third illumination intensity $\beta_{t,M}$ to the part of the composite pattern demarcated by the third mask $B_{t,M}$.

The pattern composition module 126 produces the final composite pattern $P_t$ by superimposing the above-described parts of the composite pattern $P_t$. As shown, the part of the composite pattern $P_t$ associated with the sphere 110 includes the first component pattern $P_{S,1}$ and is illuminated by the first illumination intensity $\beta_{t,1}$. The part of the composite pattern $P_t$ associated with the pyramid 112 includes the second component pattern $P_{S,2}$ and is illuminated by the second illumination intensity $\beta_{t,2}$, and the part of the composite pattern $P_t$ associated with remainder of the depth map includes the third component pattern $P_{S,M}$ and is illuminated by the third illumination intensity $\beta_{t,M}$. When projected, the different parts of the composite pattern $P_t$ will effectively impinge different parts of the scene 106.

Figure 3:
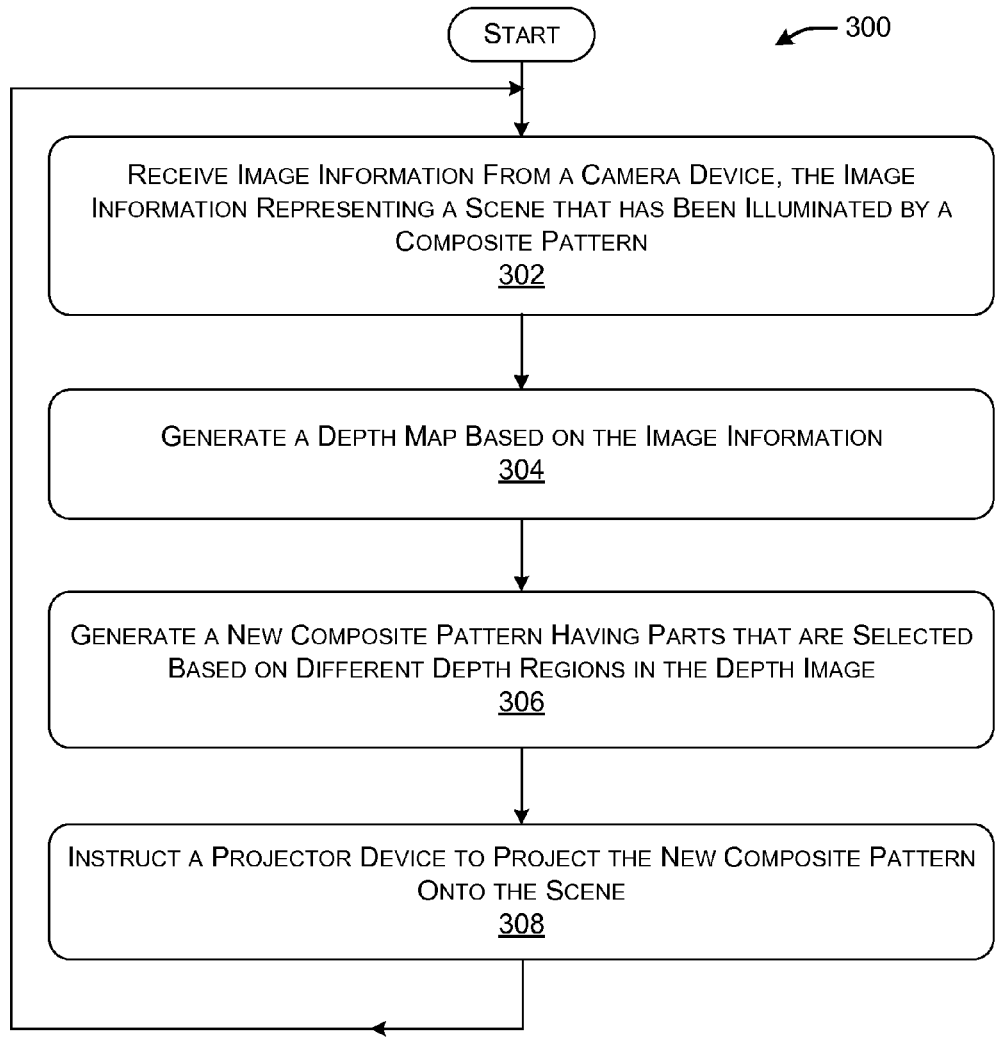
FIG. 3 is a flowchart that represents an overview of one manner of operation of the ADSS of FIG. 1.
Figure 4:
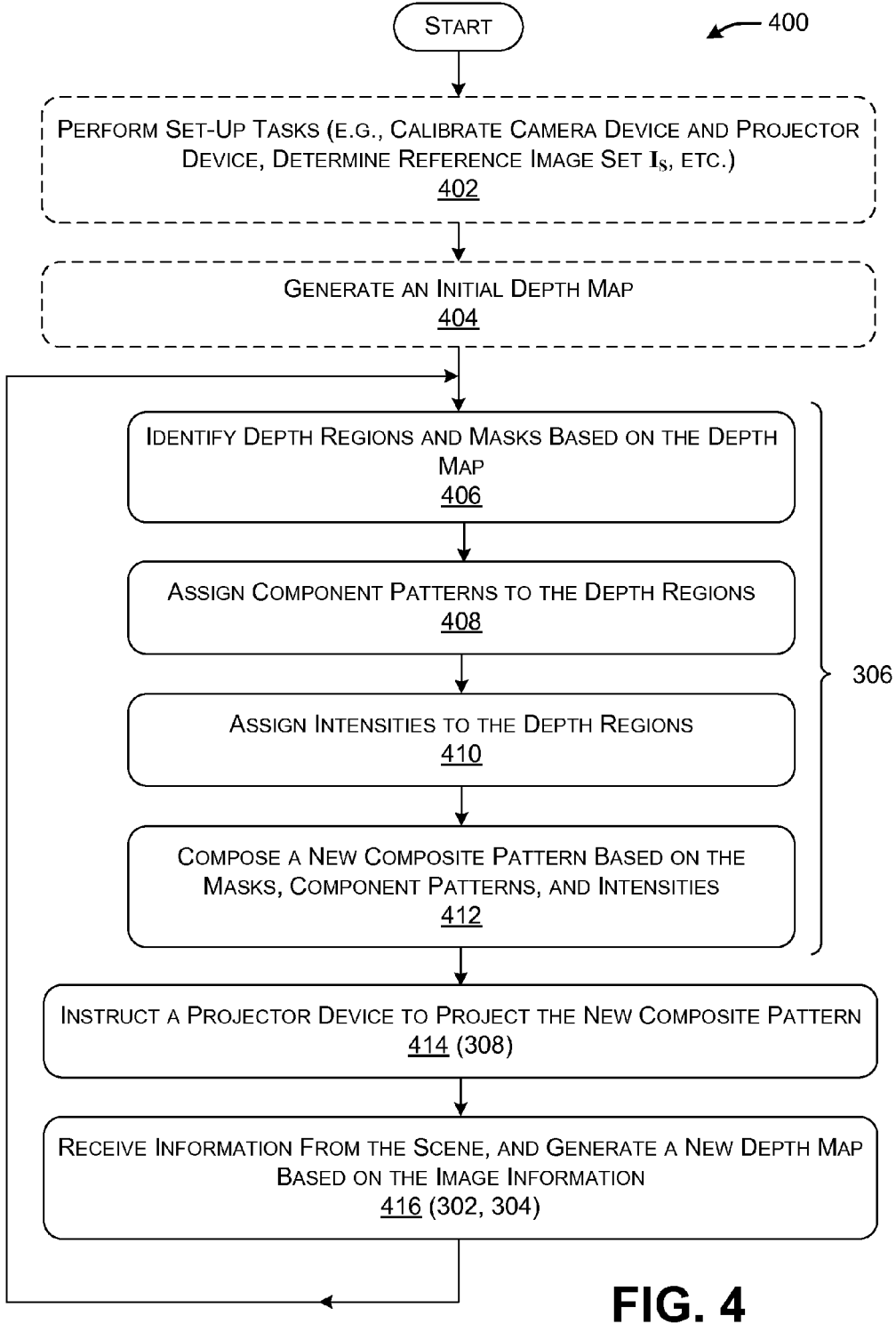
FIG. 4 is a flowchart that represents a more detailed explanation of one manner of operation of the ADSS of FIG. 1.

FIG. 3 shows a procedure 300 which represents an overview of one manner of operation of the ADSS 102 of FIG. 1. FIG. 4 shows a procedure 400 that represents a more detailed explanation of the operation of the ADSS 102. Since the operation of the ADSS 102 has already been described in the context of FIG. 1, the explanation of FIGS. 3 and 4 will serve as a summary.

In block 302 of FIG. 302, the ADSS 102 receives image information from the camera device 108. The image information represents a scene that has been illuminated by a composite pattern. In block 304, the ADSS 102 generates a depth map based on the captured image information. In block 306, the ADSS 102 generates a new composite pattern having parts that are selected based on different depth regions within the depth map. In block 308, the ADSS 102 instructs the projector device 104 to project the new composite pattern onto the scene 106. This process repeats throughout the image capture session. Overall, the depth determination module 116 and the pattern generation functionality 118 cooperatively interact to reduce defocus blur, underexposure, and overexposure in the captured image information.

Advancing to FIG. 4, in block 402, the ADSS 102 performs various set-up tasks, such as calibrating the camera device 108 and the projector device 104. In block 404, the ADSS 102 generates an initial depth map. Section D (below) provides details regarding blocks 402 and 404.

In block 406, the ADSS 102 identifies depth regions in the depth map, and generates masks corresponding to the depth regions. In block 408, the ADSS 102 assigns component patterns to the depth regions. In block 410, the ADSS 102 assigns illumination intensities to the depth regions. In block 412, the ADSS 102 composes a new composite pattern $P_t$ based on the masks, component patterns, and illumination intensities that have been determined in blocks 406-410. Blocks 406-412 correspond to block 306 of FIG. 3.

In block 414 (corresponding to block 308 of FIG. 3), the ADSS 102 instructs the projector device 104 to project the new composite pattern $P_t$ onto the scene 106. In block 416 (corresponding to blocks 302 and 304 of FIG. 3), the ADSS 102 receives information from the camera device 108 and generates a new depth map based on the image information. In the context of the subsequent generation of yet another new composite pattern $P_{t+1}$, the depth map $D_t$ that is generated in block 416 can be considered the "prior" depth map.

More specifically, recall that depth determination module 116 computes the pattern shift between the captured image information $I_t$ and the reference image $I_t'$, and then uses the triangulation principle to compute the depth map. The reference image $I_t'$ can be generated based on the equation:

$$I_t' = \sum_{m=1}^{M} I_{S,m} B'_{t,m}, t > 1.$$

$I_{S,m}$ refers to a component reference image in a reference image set $I_S$. Section D describes one way in which the reference image set $I_S$ can be calculated. $B'_{t,m}$ refers to a resized version of the mask $B_{t,m}$, determined by mapping between the projector device coordinates and the camera device coordinates. This mapping can be derived from the calibration of the projector device 104 and the camera device 108, which is also described in Section D.

As a final point, the ADSS 102 is described above as generating a new composite pattern $P_t$ based on only the last-generated depth map $D_{t-1}$. But, as said, the ADSS 102 can alternatively generate the new composite pattern $P_t$ based on the n last depth maps, where n≥2. In this case, the region analysis module 120 can analyze the plural depth maps to predict, for each object in the scene 106, the likely depth of that object at the time of projection of the composite pattern $P_t$. The region analysis module 120 can perform this task by extending the path of movement of the object, where that path of movement is exhibited in the plural depth maps.

B. Deriving the Component Patterns

Figure 5:
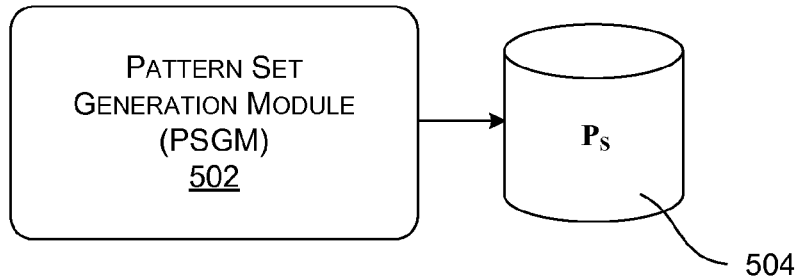
FIG. 5 shows functionality for generating a set of component patterns.

FIG. 5 shows a pattern set generation module (PSGM) 502 for generating a set of component patterns $P_s$. As described in Section A, the component patterns include features having different respective properties. For example, as shown in FIG. 2, the component patterns may include speckle features having different respective sizes. A data store 504 stores the set of component patterns $P_s$. The data store 504 is accessible to the pattern generating functionality 118.

Figure 6:
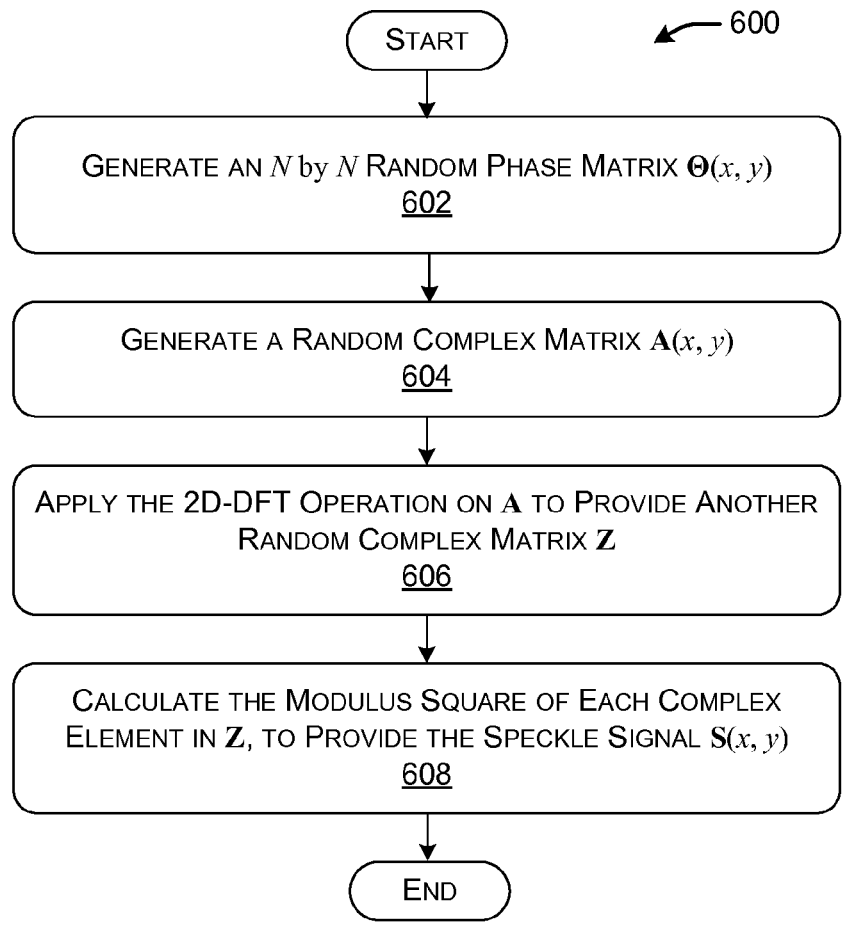
FIG. 6 is a flowchart that represents one way of generating the set of component patterns.

FIG. 6 shows one procedure 600 for creating a set of component speckle patterns $P_s$ using a simulation technique. Generally, speckle occurs when many complex components with independent phase are superimposed. FIG. 6 simulates this phenomenon using the Discrete Fourier Transform (DFT). FIG. 6 will be explained below with respect to the generation of a single component pattern having a particular speckle feature size. But the same process can be repeated for each component speckle pattern in $P_s$, having its associated speckle feature size.

Beginning with block 602, the PSGM 502 produces an N by N random phase matrix Θ, defined as:

$$\Theta(x, y) = \begin{cases} \theta_{U[0,1]}, & 1 \leq x, y \leq N/K \\ 0, & \text{otherwise.} \end{cases}$$

In this equation, $\theta_{U[0,1]}$ denotes a random number taken from a uniform distribution on the interval [0,1], and K represents a factor of N that ultimately will determine the size of the speckle features in the component pattern being generated.

In block 604, the PSGM 502 produces a random complex matrix A, defined as:

$$A(x,y) = e^{2\pi i \Theta(x,y)}, 1 \leq x, y \leq N.$$

In block 606, the PSGM 502 applies a 2D-DFT operation on A to yield another random complex matrix Z, defined as:

$$Z(x, y) = \sum_{u=1}^{N} \sum_{v=1}^{N} A(u, v) e^{-2\pi i (ux+vy)/N}, 1 \leq x, y \leq N.$$

In block 608, the PSGM 502 generates the component pattern, represented by speckle signal S, by calculating the modulus square of each complex element in Z, to yield:

$$S(x,y) = |Z(x,y)|^2, 1 \leq x, y \leq N.$$

In one merely representative environment, the PSGM 502 performs the procedure 600 of FIG. 6 for K=4, 8, 16, and 32, resulting in four component patterns. The component pattern for K=4 will have the smallest speckle feature size, while the component pattern for K=32 will have the largest speckle feature size.

As mentioned above, other implementations of the ADSS 102 can use component patterns having other types of features to produce structured light when projected onto the scene 106. In those contexts, the PSGM 502 would generate other types of component patterns, such as component patterns having code-bearing features.

C. Deriving the Mapping Table

Figure 7:
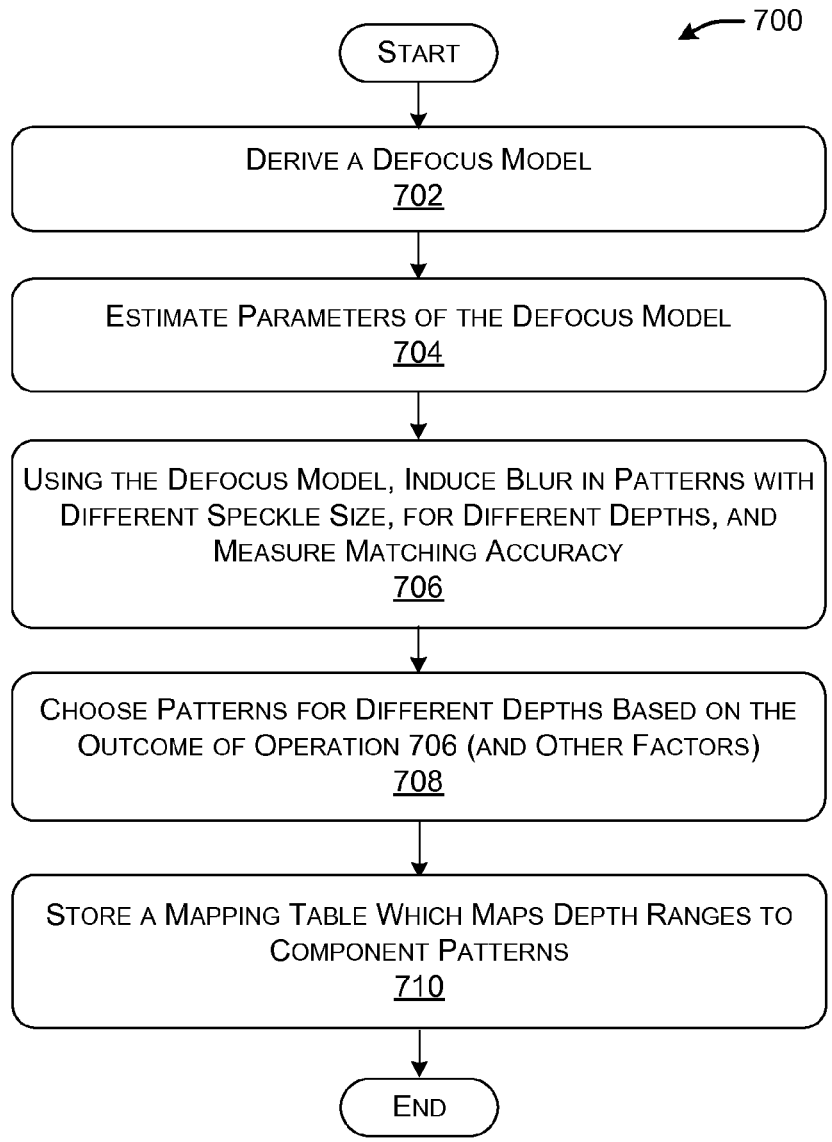
FIG. 7 is a flowchart that represents one approach for deriving a mapping table. The mapping table maps different depth ranges to different respective component patterns.

FIG. 7 represents a procedure 700 for deriving a mapping table. As described in Section A, the mapping table correlates different depth ranges in a scene with different component patterns. The component pattern that maps to a particular depth range corresponds to the appropriate component pattern to project onto surfaces that fall within the depth range, so as to reduce the effects of defocus blur, underexposure, and overexposure.

Figure 8:
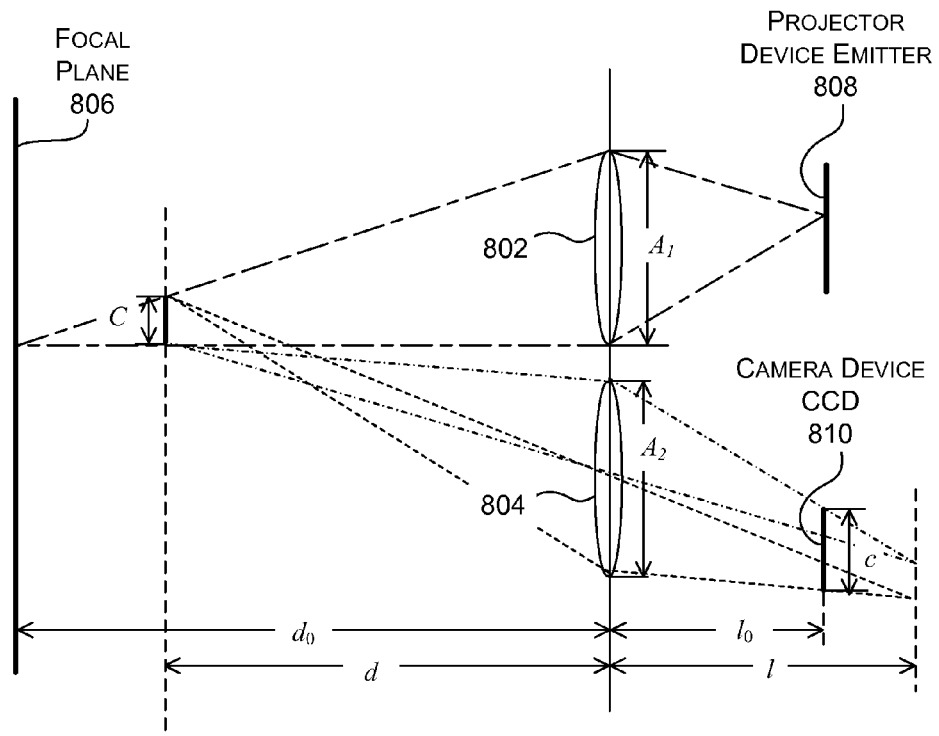
FIG. 8 shows a lens and ray diagram associated with a projector device and a camera device which interact with the ADSS. This diagram is used to derive a blur model.

In block 702, a defocus model is derived to simulate the effects of blur at different depths. One manner of deriving the defocus model is described below with reference to the representative lens and ray diagram of FIG. 8. More specifically, FIG. 8 shows a projector lens 802 used by the projector device 104, and a camera lens 804 used by the camera device 108. In this merely representative configuration, the projector lens 802 is vertically disposed with respect to the camera lens 804. Further assume that the focal planes of both the projector device 104 and the camera device 108 correspond to focal plane 806, which occurs at distance $d_0$ with respect to the projector lens 802 and the camera lens 804. The projector device 104 has an aperture $A_1$, while camera device 108 has an aperture $A_2$. A projector device emitter 808 projects light into the scene 106 via the projector lens 802, while a camera device CCD 810 receives light from the scene 106 via the camera lens 804. The camera device CCD 810 is located at a distance of $l_0$ from the camera device lens 804. A point from the focal plane 806 (at distance $d_0$) will converge on the camera device CCD 810.

Consider the case of an object plane at distance d. Because d is not coincident with $d_0$, a blur circle having diameter C, on the object plane, is caused by defocus of the projector device 104. Using the principle of similar triangles, the projector device's blur circle C can be expressed as:

$$C = A_1 \frac{|d_0 - d|}{d_0}.$$

Moreover, a point from the object plane at distance d will converge beyond the camera device CCD 810, at a distance l to the camera device lens 804. Thus, another blur circle, of diameter c, on the camera device CCD 810, is caused by defocus of the camera device 108. Using the principle of similar triangles, the camera device's blur circle c can be expressed as:

$$c = \frac{l_0}{d} C + A_2 \frac{|l - l_0|}{l}.$$

Assume that the focal length of the camera device 108 is F. According to the lens equation:

$$\frac{1}{F} = \frac{1}{l_0} + \frac{1}{d_0} = \frac{1}{l} + \frac{1}{d}.$$

Using the above equation, c can be alternatively expressed as:

$$c = \frac{(A_1 + A_2)F}{d_0 - F} \frac{|d_0 - d|}{d}.$$

The defocus bur can be modeled as an isotropic, two-dimensional Gaussian function. The standard deviation $\sigma$ of this function is proportional to the blur circle c. Since $A_1$, $A_2$, $d_0$, and F are all constants, the standard deviation can be expressed as:

$$\sigma = k \left| \frac{d_0}{d} - 1 \right| + \sigma_0.$$

Returning to FIG. 7, in block 702, the parameters k and $\sigma_0$ in the above equation are estimated. To perform this task, the projector device 104 can project a pattern with repetitive white dots as an impulse signal. The camera device 108 can then capture the resultant image information for different object planes at different depths. The diameter of blur (measured in pixels) exhibited by the image information can then be computed for different depths.

Figure 9:
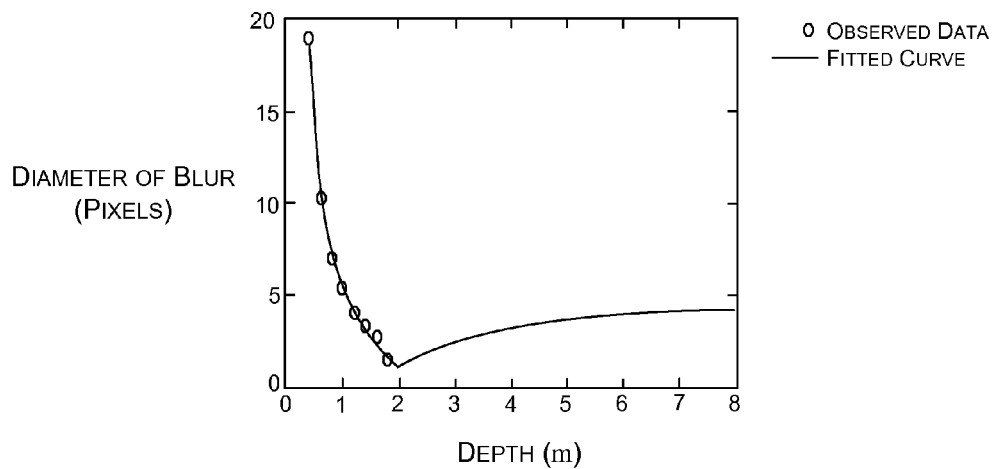
FIG. 9 shows a relationship between depth and diameter of blur. This relationship is used to determine parameters of the blur model.

For example, FIG. 9 shows, for one illustrative environment, measurements of the diameter of blur with respect to different depths, where the focal plane is at a distance of 2.0 m. The least square method can then be used to fit a curve to the observations in FIG. 9. That curve yields the values of k and $\sigma_0$. In one merely representative environment, k is estimated to be approximately 4.3 and $\sigma_0$ is estimated to be approximately 1.0. Note that the diameter of blur converges to a low value on the far side of the focal plane (at distances greater than 2.0 m). Thus, it is not necessary to consider defocus blur at those far distances.

Figure 10:
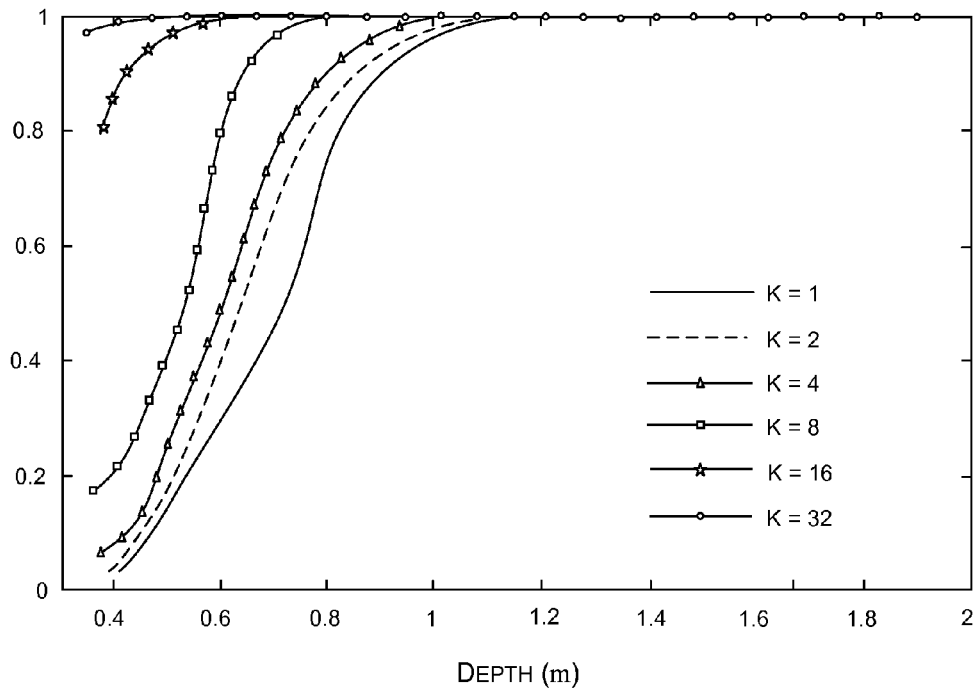
FIG. 10 shows relationships between depth and the matching accuracy, with respect to different component patterns. These relationships are produced by inducing blur in component patterns using the blur model, and comparing the unblurred component patterns with the blurred component patterns.

In block 706 of FIG. 7, the defocus model that has just been derived is used to induce blur in different component patterns, for different depths. Then, a measure is generated that reflects how closely the original (un-blurred) component pattern matches its blurred counterpart. For example, that measure can define the number of elements in the original component pattern that were successfully matched to their blurred counterparts. FIG. 10 shows the representative outcome of this operation, in one illustrative environment, for depths ranging from 0.4 m to 2.0 m, and for speckle feature sizes of K=1 (the smallest) to K=32 (the largest).

In block 708 of FIG. 7, component patterns are chosen for different depth ranges. Different considerations play a role in selecting a component pattern for a particular depth range. The considerations include at least: (a) the matching accuracy (as represented by FIG. 10); (b) local distinguishability; and (c) noise.

Matching Accuracy. Matching accuracy refers to the ability of a component pattern to effectively reduce defocus blur within a particular depth range. In this regard, FIG. 10 indicates that larger speckle features perform better than smaller speckle features as the object plane draws farther from the focal plane 806 (and closer to the projector lens 802 and camera lens 804). Consider, for example, a first component pattern having a first feature size $K_1$, and a second component pattern having a second feature size $K_2$, where $K_1 > K_2$. By considering matching accuracy alone, the first component pattern is appropriate for a first depth range $d_1$ and the second component pattern is appropriate for a second depth range $d_2$, providing that $d_1 < d_2$.

Local distinguishability. Local distinguishability refers to the ability of the ADSS 102 to obtain accurate depth readings around object boundaries. With respect to this consideration, smaller speckle features perform better than larger speckle features.

Noise. Noise refers to the amount of noise-like readings produced when capturing image information. With respect to this consideration, smaller speckle features induce more noise than larger speckle features.

A system designer can take all of the above-described factors into account in mapping different component patterns to respective depth ranges, e.g., by balancing the effects of each consideration against the others. Different mappings may be appropriate for different environment-specific objectives. In some cases, the system designer may also wish to choose a relatively small number of component patterns to simplify the operation of the ADSS 102 and make it more efficient.

Figure 11:
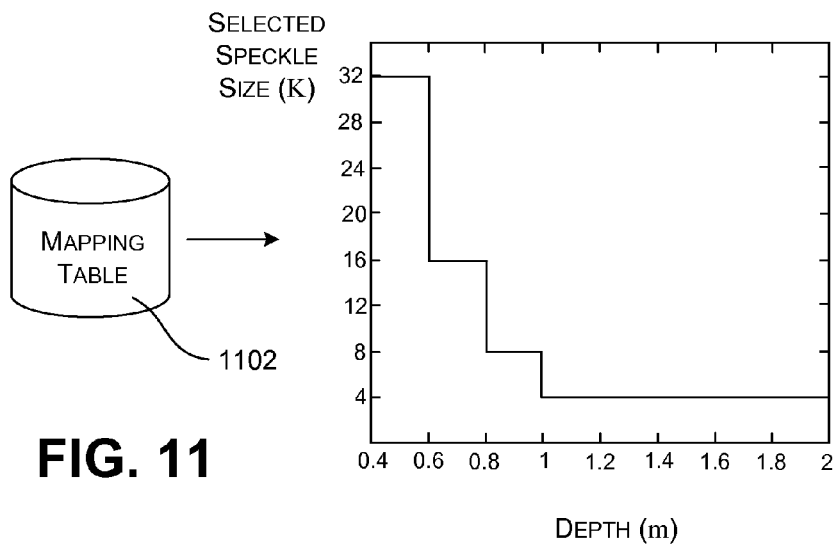
FIG. 11 shows one representative mapping table which maps different depth ranges to different respective component patterns. This mapping table is produced, in part, based on analysis of the relationships of FIG. 10.

FIG. 11 shows one mapping table which maps component patterns (associated with different speckle feature sizes) with different depth ranges. In block 710 of FIG. 7, the mapping table is stored in a data store 1102. The pattern assignment module 122 has access to the mapping table in the data store 1102.

D. Preliminary Operations

Returning to FIG. 4, in block 402, the system designer can calibrate the projector device 104 and the camera device 108. This ultimately provides a way of mapping the coordinate system of the projector device 104 to the coordinate system of the camera device 108, and vice versa. Known strategies can be used to perform calibration of a structured light system, e.g., as described in Jason Geng, "Structured-light 3D surface imaging: a tutorial," *Advances in Optics and Photonics*, Vol. 3, 2011, pp. 128-160. For example, block 402 may entail calibrating the camera device 108 by capturing image information of a physical calibration object (e.g., a checkerboard pattern) placed at known positions in the scene 106, and calibrating the camera device 108 based on the captured image information. Calibration of the projector device 104 (which can be treated as an inverse camera) may entail projecting a calibration pattern using the projector device 104 onto a calibration plane, capturing the image information using the calibrated camera device 108, and calibrating the projector device 104 based on the captured image information.

Block 402 also involves generating the reference image set $I_S$, where $I_S = \{I_{S,m}\}_{m=1}^M$. Each component reference image $I_{S,m}$ in the set is produced by projecting a particular component pattern (having a particular property) onto a reference plane at a known depth $D_0$, oriented normally to the light path of the projector device 104. The camera device 108 then captures image information of the scene 106 to yield $I_{S,m}$.

In block 404, the set-up functionality 128 determines an initial depth map. In one approach, the set-up functionality 128 can instruct the projector device 104 to successively project different component patterns in the set $P_S$, at different illumination intensities. The depth determination module 116 can then provide depth maps for each combination of $P_{s,m}$ and $\beta_{s,m}$. For each point in the scene, the set-up functionality 128 then selects the depth value that occurs most frequently within the various depth maps that have been collected. This yields the initial depth map when performed for all points in the scene.

E. Representative Computing Functionality

FIG. 12 sets forth illustrative computing functionality 1200 that can be used to implement any aspect of the functions described above. For example, the computing functionality 1200 can be used to implement any aspect of the ADSS 102. In one case, the computing functionality 1200 may correspond to any type of computing device that includes one or more processing devices. In all cases, the computing functionality 1200 represents one or more physical and tangible processing mechanisms.

The computing functionality 1200 can include volatile and non-volatile memory, such as RAM 1202 and ROM 1204, as well as one or more processing devices 1206 (e.g., one or more CPUs, and/or one or more GPUs, etc.). The computing functionality 1200 also optionally includes various media devices 1208, such as a hard disk module, an optical disk module, and so forth. The computing functionality 1200 can perform various operations identified above when the processing device(s) 1206 executes instructions that are maintained by memory (e.g., RAM 1202, ROM 1204, and/or elsewhere).

More generally, instructions and other information can be stored on any computer readable storage medium 1210, including, but not limited to, static memory storage devices, magnetic storage devices, optical storage devices, and so on. The term computer readable storage medium also encompasses plural storage devices. In all cases, the computer readable storage medium 1210 represents some form of physical and tangible entity.

The computing functionality 1200 also includes an input/output module 1212 for receiving various inputs (via input modules 1214), and for providing various outputs (via output modules). One particular output mechanism may include a presentation module 1216 and an associated graphical user interface (GUI) 1218. The computing functionality 1200 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An adaptive depth sensing system, implemented by computing functionality, comprising:
a processor for implementing computing functionality for modules comprising:
a depth determination module configured to generate a depth map based on image information received from a camera device; and
pattern generation functionality configured to:
analyze the depth map to provide an analysis result;
generate a composite pattern based on the analysis result; and
instruct a projector device to project the composite pattern onto a scene,
the depth determination module and pattern generation functionality configured to repeatedly generate depth maps and composite patterns, respectively,
the depth determination module and pattern generation functionality being implemented by the computing functionality.

2. The adaptive depth sensing system of claim 1, wherein the depth determination module and the pattern generation functionality cooperatively interact to reduce occurrence of at least one of: defocus blur in the image information; underexposure in the image information; and overexposure in the image information.

3. The adaptive depth sensing system of claim 1, wherein said pattern generating functionality includes a region analysis module that is configured to:
  identify depth regions in the depth map, each depth region corresponding to a region of the scene with similar depths with respect to a reference point; and
  identify a set of masks associated with the depth regions.

4. The adaptive depth sensing system of claim 3, wherein said pattern generating functionality also includes a pattern assignment module that is configured to assign component patterns to the respective depth regions, each component pattern including features having a particular property, and different component patterns including features having different respective properties.

5. The adaptive depth sensing system of claim 3, wherein said pattern generating functionality also includes an intensity assignment module that is configured to assign an illumination intensity $\beta$ for a depth region j in the depth map, as given by:

$$\beta = \lambda \frac{d_j^2}{d_0^2} + b,$$

where $d_j$ is a representative depth of the depth region j in the depth map, $d_0$ is a reference depth, and $\lambda$ and b are constants.

6. The adaptive depth sensing system of claim 1, wherein the composite pattern is given by:

$$P_t = \sum_{m=1}^{M} P_{S,m} B_{t,m} \beta_{t,m},$$

where $P_t$ is the composite pattern, M is a number of parts in the composite pattern, $P_{S,m}$ is a component pattern for application to part m, $B_{t,m}$ is a mask which defines the part m, $\beta_{t,m}$ is an illumination intensity for application to part m, and t is time.

7. A method, performed by computing functionality, for generating a depth map, comprising:
  receiving image information from a camera device, the image information representing a scene that has been illuminated with a composite pattern;
  generating a depth map based on the image information, the depth map having depth regions, each depth region corresponding to a region of the scene having similar depths with respect to a reference point;
  generating a new composite pattern having parts that are selected based on the respective depth regions in the depth map;
  instructing a projector device to project the new composite pattern onto the scene; and
  repeating said receiving, generating a depth map, generating a new composite pattern, and instructing at least one time.

8. The method of claim 7, wherein said generating a new composite pattern includes:
  identifying the depth regions in the depth map; and
  identifying a set of masks associated with the respective depth regions.

9. The method of claim 7, wherein said generating a new composite pattern includes assigning component patterns to the respective depth regions, each component pattern including features having a particular property, and different component patterns including features having different respective properties.

10. The method of claim 9, wherein the particular property associated with each component pattern is feature size.

11. The method of claim 10, wherein the features associated with each component pattern correspond to speckle features of a particular size.

12. The method of claim 9, wherein the particular property associated with each component pattern is code-bearing design.

13. The method of claim 9, wherein said assigning involves assigning a first component pattern having a first feature size $K_1$ for a first depth region $d_1$ and a second component pattern having a second feature size $K_2$ for a second depth region $d_2$, where $K_1 > K_2$ if $d_1 < d_2$.

14. The method of claim 9, wherein the component patterns are produced using a simulation technique.

15. The method of claim 7, wherein said generating a new composite pattern includes assigning illumination intensities to the respective depth regions.

16. The method of claim 15, wherein an illumination intensity $\beta$ for a depth region j is given by:

$$\beta = \lambda \frac{d_j^2}{d_0^2} + b,$$

where $d_j$ is a representative depth of the depth region j in the depth map, $d_0$ is a reference depth, and $\lambda$ and b are constants.

17. The method of claim 7, wherein the new composite pattern is given by:

$$P_t = \sum_{m=1}^{M} P_{S,m} B_{t,m} \beta_{t,m},$$

where $P_t$ is the new composite pattern, M is a number of parts in the new composite pattern, the parts being associated with different respective depth regions, $P_{S,m}$ is a component pattern for application to part m, $B_{t,m}$ is a mask which defines the part m, $\beta_{t,m}$ is an illumination intensity for application to part m, and t is time.

18. The method of claim 7, wherein the new composite pattern is formed based on a consideration of n previously generated depth maps, where $n \geq 2$.

19. A computer readable storage device for storing computer readable instructions, the computer readable instructions providing an adaptive depth sensing system when executed by one or more processing devices, the computer readable instructions comprising:
  logic configured to receive image information from a camera device, the image information representing a scene that has been illuminated with a composite pattern;
  logic configured to generate a depth map based on the image information;
  logic configured to identify depth regions in the depth map, each depth region corresponding to a region of the scene with similar depths with respect to a reference point;
  logic configured to identify a set of masks associated with the depth regions;

logic configured to assign component patterns to the respective depth regions, each component pattern including features having a particular property, and different component patterns including features having different respective properties;

logic configured to assign illumination intensities to the respective depth regions;

logic configured to produce a new composite pattern based on the masks, component patterns, and illumination intensities; and logic configured to instruct a projector device to project the new composite pattern onto the scene.

20. The computer readable storage device of claim 19, wherein the new composite pattern is given by:

$$P_t = \sum_{m=1}^{M} P_{S,m} B_{t,m} \beta_{t,m},$$

where $P_t$ is the new composite pattern, M is a number of parts in the new composite pattern, the parts being associated with different respective depth regions, $P_{S,m}$ is a component pattern for application to part m, $B_{t,m}$ is a mask which defines the part m, $\beta_{t,m}$ is an illumination intensity for application to part m, and t is time.

* * * * *